(12) United States Patent
Shastri et al.

(10) Patent No.: US 7,291,693 B2
(45) Date of Patent: Nov. 6, 2007

(54) BIOERODIBLE CONDUCTING MATERIALS

(75) Inventors: Venkatram Prasad Shastri, Lower Gwynedd, PA (US); Alexander Zelikin, Moscow (RU); David Lynn, Middleton, WI (US); Robert S. Langer, Newton, MA (US); Ivan Martin, Oberwil (CH)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/180,000

(22) Filed: Jun. 25, 2002

(65) Prior Publication Data

US 2003/0166831 A1    Sep. 4, 2003

Related U.S. Application Data

(60) Provisional application No. 60/300,767, filed on Jun. 25, 2001.

(51) Int. Cl.
*C08G 73/06* (2006.01)

(52) U.S. Cl. .................. 528/423; 528/424; 528/271; 528/287; 528/293

(58) Field of Classification Search ................ 528/423, 528/424, 271, 287, 293
See application file for complete search history.

(56) References Cited

U.S. PATENT DOCUMENTS 5,384,215 A    1/1995    Sato et al.
5,843,741 A    12/1998   Wong et al.
5,948,232 A    9/1999    Murphy et al.
6,095,148 A    8/2000    Shastri et al.
6,190,893 B1   2/2001    Shastri et al.
6,206,937 B1   3/2001    Kudoh et al.
6,214,260 B1   4/2001    Bessette et al.
6,355,224 B1   3/2002    Shastri et al.
6,569,654 B2   5/2003    Shastri et al.
2003/0142901 A1 7/2003   Lahann et al.

FOREIGN PATENT DOCUMENTS

WO    WO97/16545 A1   5/1997
WO    WO 00/15267 A1  3/2000
WO    WO 00/17322 A2  3/2000
WO    WO 02/078679 A2 10/2002

OTHER PUBLICATIONS

Voigt et al, Derivatives of polypyrrole with deconjugated carbonyl substituents in beta position, Journal 1993, Chem Abstract 119: 181366.
Zelikin et al, Facile synthesis of 3-alkylpyrroles, Journal of Organic Chemistry, 1999, 64(9): 3379-80.
Bartlett et al, Electrochemistry and contact angle—(3-pyrrolyl)-alkanoic acids in aqueous solution, Journal, 2000, Chem Abstract 134: 48489.
Garnier, Electrically conductive and electroactive—pyrrole derivatives and their uses, French Patent, 1995, Chem Abstract 124:118361.

(Continued)

*Primary Examiner*—Duc Truong
(74) *Attorney, Agent, or Firm*—Ropes & Gray LLP (57) ABSTRACT

The present invention specifically contemplates a polymer, preferably an electrically conductive polymer, derived from substituted pyrrolyl moieties.

16 Claims, 3 Drawing Sheets

A - poly [Methyl-4-(beta-Pyrrolyl)-butyrate]
B - poly [4-(beta-Pyrrolyl)-butyric acid]

OTHER PUBLICATIONS

Ho-Hoang et al, Synthesis and characterization—(1 H-pyrrol-3-yl) acetic acid esters, Journal 1996, Chem Abstract 125: 115754.

Ho-Hoang et al, Synthesis and polymerization of—derivatives from pyrrole, Journal 1996, Chem Abstract 124: 290395.

Ryder et al, Tailored polymers to probe the nature of the bioelectrochemical interface, Journal 1996, Chem Abstract 125: 277095.

Schmidt et al, Stimulation of neurite outgrowth using an electrically conducting polymer, Proc. Nat. Acad. Sci., 1997, 94(17): 8948-53.

Figure 1

Figure 2 pH dependence of 4-(β-pyrrolyl)-butyric acid

*Figure 3*

BIOERODIBLE CONDUCTING MATERIALS

CROSS-REFERENCE TO RELATED APPLICATIONS

This application claims the benefit of priority of U.S. Provisional Application No. 60/300,767, filed Jun. 25, 2001, the specification of which is incorporated by reference herein in its entirety.

BACKGROUND OF THE INVENTION

Polypyrrole (Ppy), an electrically conducting polymer has been explored in various biomedical applications including drug delivery, DNA immobilization, biosensors, and as tissue culture. Tissue culture studies employing Ppy thin film substrates have shown that the nature of the counter ion dopant incorporated within the polymer matrix can influence mammalian cell adhesion and proliferation and that the application of electrical stimuli through the Ppy provides a means of controlling cell cycle progression and cell differentiation. Oxidized Ppy is stable under physiological conditions and has both short- and long-term in vivo tissue biocompatibility. Because Ppy can be synthesized electrochemically, thin films of Ppy can be deposited on either flat or complex surfaces. The deposition of Ppy on the surface of medical device (such as vascular stents) could be used to modify the surface so as to elicit favorable cellular responses. However applications of Ppy toward new device development and in emerging fields such as tissue engineering have been hindered by the fact that Ppy is not biodegradable.

It is an object of the present invention to provide biodegradable Ppy analogs that exhibits tissue biocompatibility.

SUMMARY OF THE INVENTION

One aspect of the invention provides a polymer composition comprising a plurality of subunits having a structure of Formula I:

Formula I wherein, as valence and stability permit, and independently for each subunit,
  X represents O or S;
  $R_1$ is absent or represents a substitute on the ring to which it is attached;
  R represents H or substituted or unsubstituted lower alkyl, lower alkenyl, lower alkynyl, cycloalkyl, cycloalkylalkyl, heterocyclyl, heterocyclylalkyl, aralkyl, or heteroaralkyl, preferably H or lower alkyl; and
  m represents an integer from 0 to 10, preferably from 1 to 6.

Another aspect of the invention provides a polymer represented by Formula Formula II wherein, as valence and stability permit,
  X represents O or S;
  $R_1$ is absent or represents a substituent on the ring to which it is attached;
  R represents H or substituted or unsubstituted lower alkyl, lower alkenyl, lower alkynyl, aralkyl, or heteroaralkyl;
  m represents an integer from 0 to 10, preferably from 1 to 6; and
  n represents an integer greater than 5

Still another aspect of the invention provides a polymer comprising a plurality of subunits having a structure of Formula III:

Formula III wherein, as valence and stability permit, and independently for each subunit,
  X represents O or S;
  Z represents a substituent that is charged under physiological conditions or is hydrolyzable to such a substituent under physiological conditions;
  L represents a substituted or unsubstituted alkyl moiety;
  $R_1$ is absent or represents a substituent on the ring to which it is attached;
  R represents H or substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl; and
  m represents an integer from 0 to 10.

In certain embodiments, the subject invention provides a polymer comprising a region having a structure of the formula:

wherein, as valence and stability permit,

R represents H or substituted or unsubstituted lower alkyl, lower alkenyl, lower alkynyl, aralkyl, or heteroaralkyl, preferably H or lower alkyl;

m represents an integer from 0 to 10; and n represents an integer greater than 5.

Certain of the subject polymer and polymer compositions support the attachment and proliferation of mammalian cells.

In certain preferred embodiments, the polymer and polymer compositions are electrically conductive.

DESCRIPTION OF THE INVENTION

Figure 3:
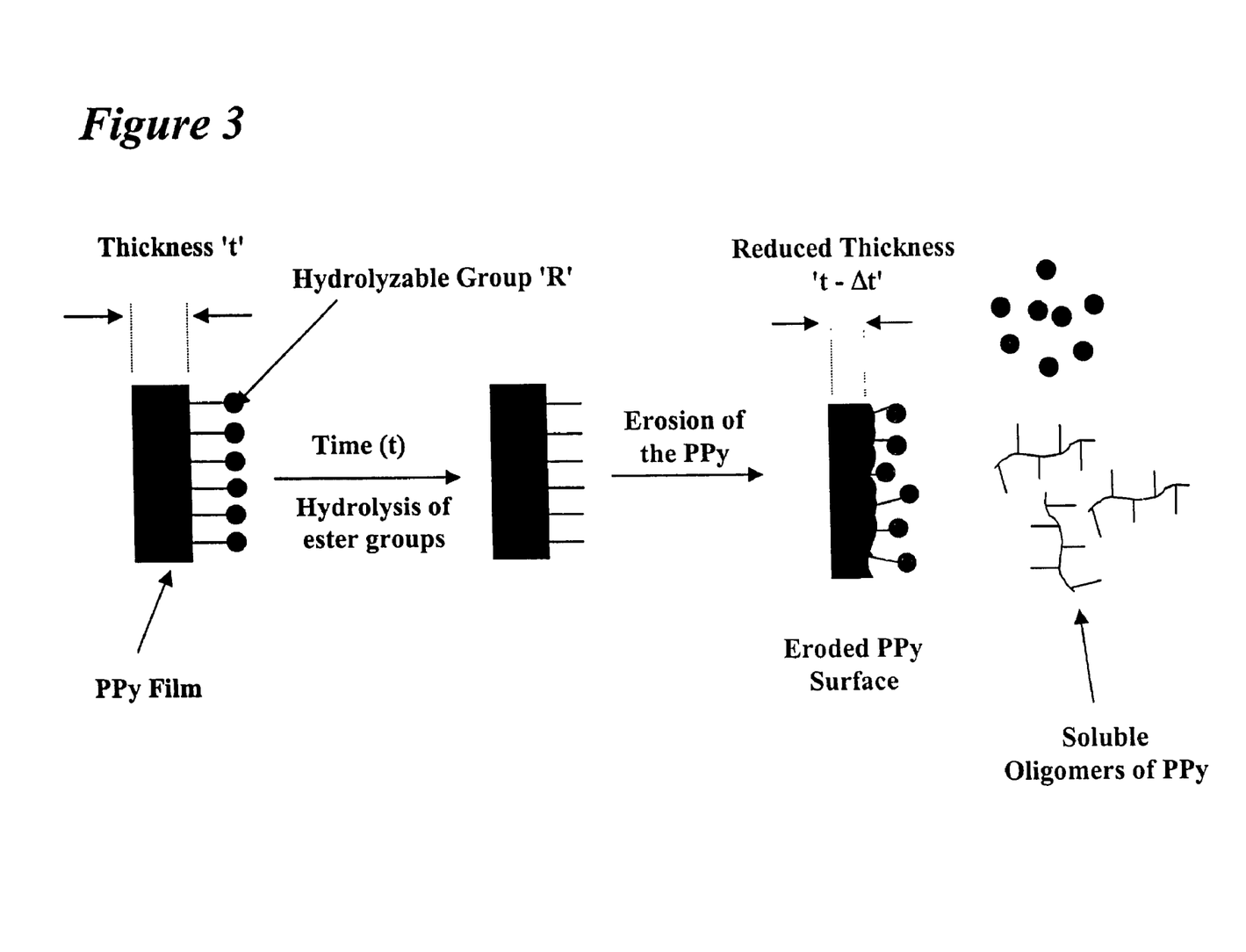
FIG. 3: Is a scheme illustrating of an eroding system.

The introduction of hydrolyzable moieties (e.g., ester) linking regions of extended conjugation represents one approach to the development of degradable conducting polymers. Such a strategy has been extended to the synthesis of polythiophenes (the sulfur analog of Ppy), although the degradability of these polymers has not been explored. Polythiophenes in comparison to Ppy however is less stable under physiological conditions. Our attempts to synthesize Ppy derivatives containing ester linkages in the backbone have thus far met with failure, primarily due to instability of the required pyrrole oligomers as well as extensive side reactions generally associated with the chemistry of functionalized pyrroles. It occurred to us that, polymers derived from pyrrole derivatives containing ionizable side groups could undergo erosion, rather than degradation, under physiological conditions. Because eroding systems typically retain their bulk properties throughout their lifetime (as opposed to most bulk degrading systems), this approach could lead to polymers that that retain their ability to conduct electricity throughout their degradative lifetime. See FIG. 3.

Figure 2:
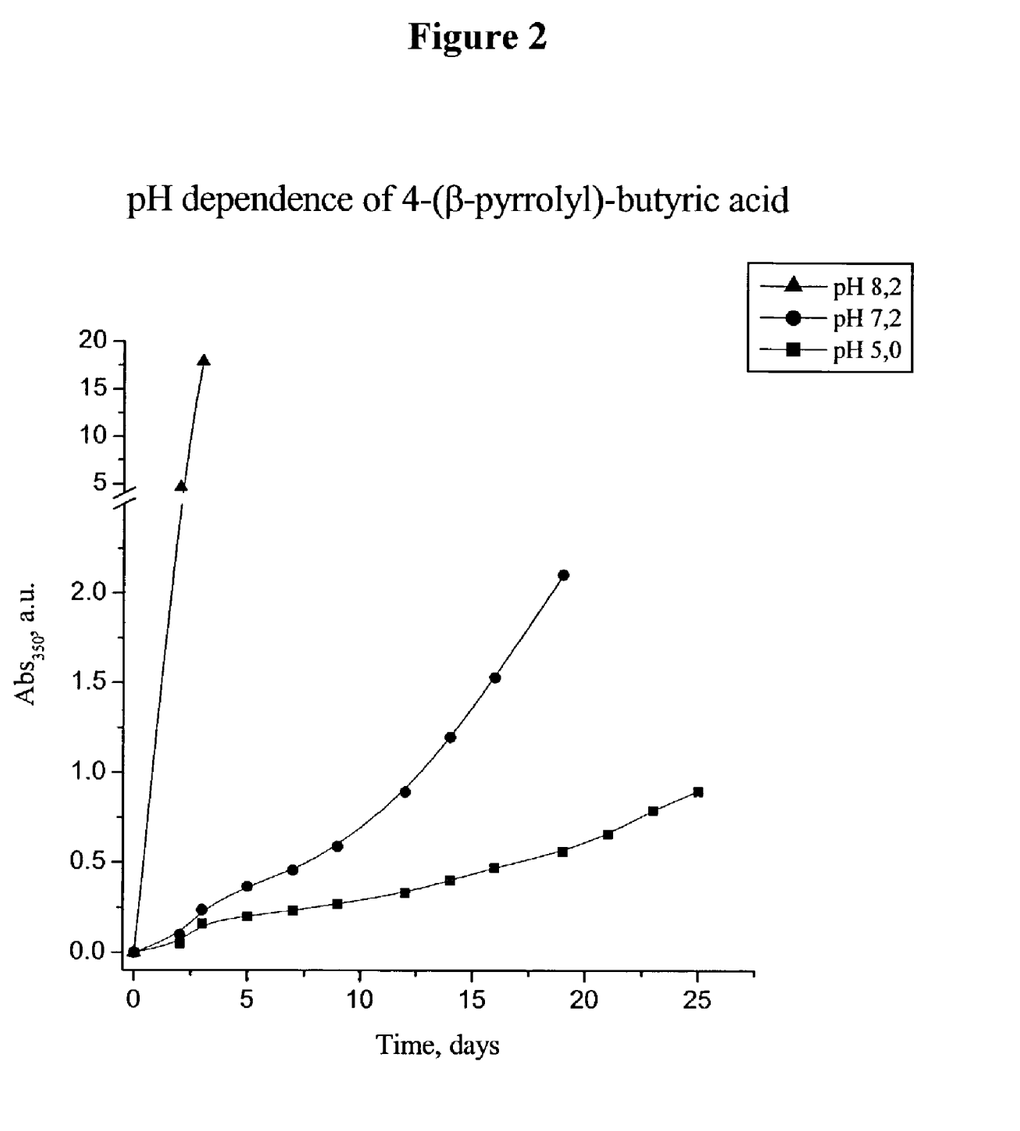
FIG. 2: Is a graph illustrating the pH dependence of 4-(beta-Pyrrolyl)-butyric acid.

To explore this concept, we prepared polymer 1 by chemical polymerization of 4-(b-pyrrolyl)-butyric acid. In this example, we hypothesized that, erosion would occur via pH-dependent ionization of the acid moiety followed by dissolution of the charged Ppy units. Pressed pellets were prepared from polymer 1 (20 mg, diameter 8 mm, thickness 0.5 mm) and erosion was investigated by UV/visible spectroscopy as a function of pH in acetate (pH 5.0), HEPES (pH 7.2) and TAE (pH 8.2) buffer (FIG. 2). The erosion/dissolution rate of pellets at pH 7.2 was twice the rate of erosion at pH 5.0, and the rate was dramatically enhanced under alkaline conditions. Because the ionization of carboxylic acids increases, from acidic to alkaline pH, these data suggest that the erosion of the pellets was indeed driven by the pH-dependent solubilization of Polymer 1.

Polymer 1: m = 3, R = H    Polymer 2: m = 3, R = CH$_3$

Figure 1:
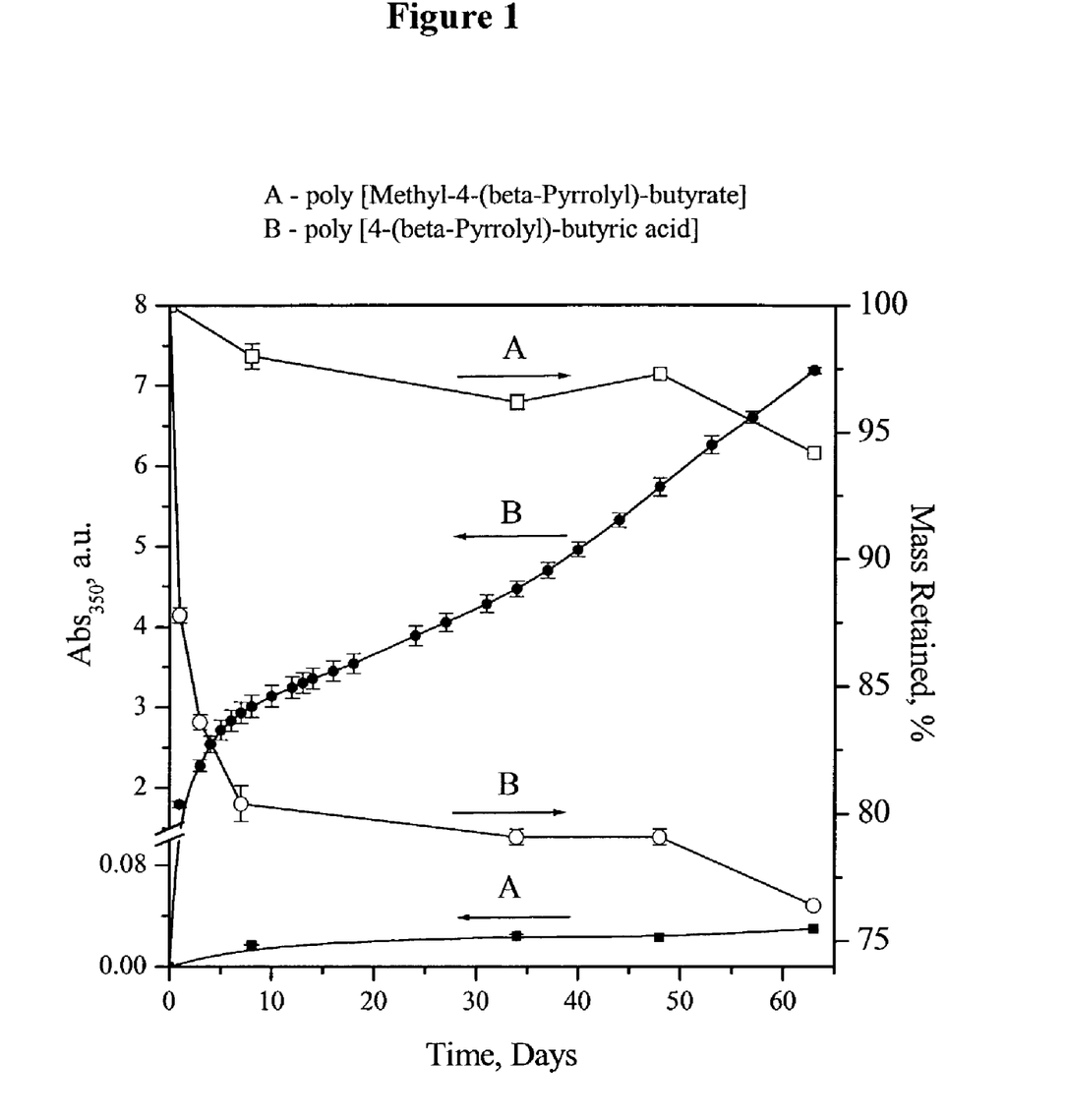
FIG. 1: Is a graph illustrating release profiles of poly[methyl-4-(beta-Pyrrolyl)-butyrate] and poly[4-(beta-Pyrrolyl)-butyric acid].

The introduction of the hydrolyzable moieties such as esters into the Ppy side chain (e.g., Polymer 2) should result in a more hydrophobic material, the rate of erosion of which should parallel the relative rates of pH-dependent ester hydrolysis. Pressed pellets formed from polymer 2 eroded much more slowly than their acid-functionalized counterparts, further supporting the above hypothesis and suggesting a means for controlling and tailoring erosion rates (see FIG. 1). Although Polymer 2 contains a methyl ester, this moiety could be substituted with functional groups ranging from hydrophobic or hydrophilic stabilizers to cell adhesion ligands such as polysaccharide or peptide sequences to provide control over both erosion rates and cell proliferation.

The erosion of the pellets formed from Polymer 1 was characterized by an initial burst of (erosion product), followed by a prolonged linear phase (see FIG. 2). This erosion profile is consistent with those observed for surface eroding polymer systems such as polyanhydrides. Scanning electron microscopy (SEM) images of a cross-section of pellets formed from polymer 1 after 40 days of incubation revealed the presence of a solid, compact central zone and a surface erosion zone extending approximately 200 microns on either side (40% of pellet thickness) into the pellet. While some erosion was evident on surfaces of the pellets formed from Polymer 2, erosion zone was far less pronounced which is consistent with the increased hydrophobicity of Polymer 2 and hence reduced erosion rates as outlined above.

Since these polymers undergo surface erosion, one might expect their surfaces to be too mobile to support cell attachment We have carried out cytocompatibility studies on Ppy-acid thin film substrates using human bone marrow stroma-derived mesenchymal progenitor cells (MPC). These studies have shown that these polymers can support the attachment and proliferation of primary human cells. In addition we evaluated the osteogenic differentiation of MPC on these substrates in the presence of an osteogenic cocktail (dexamethasone, ascorbic acid and beta glycerophosphate). The expression of osteoblast-related genes at the mRNA level was quantified and normalized to the amounts of 18-S rRNA (house keeping gene) using real-time PCR (RT-PCR). MPC differentiation towards to the osteoblast lineage, as assessed by an increase of bone sialoprotein (4.6 fold), osteopontin (2.0 fold) and collagen type I (1.5 fold) mRNA levels during the last 3 days of culture suggests that bioerodible Ppy substrates are capable of supporting human progenitor cell differentiation as well.

In light of our observations, the present invention specifically contemplates a polymer, preferably an electrically conductive polymer, comprising a plurality of subunits having a structure of Formula I:

Formula I wherein, as valence and stability permit, and independently for each subunit, X represents O or S, preferably O;

$R_1$ represents a substituent on the ring to which it is attached, such as H, lower alkyl, hydroxyl, amino, thiol, alkoxy, alkylamino, alkylthio, carbonyl, nitro, cyano, halogen, acyloxy, or acylamino, preferably H;

R represents H or substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl, preferably H or lower alkyl; and m represents an integer from 0 to 10, preferably from 1 to 6.

In certain embodiments, a subject polymer may consist essentially of such subunits, or may include, separately or interspersed with subunits as described above, up to 10%, up to 20%, up to 30%, or even up to 50% of other subunits, such as pyrrolyl subunits substituted with moieties other than those described above.

In other embodiments, the subject method contemplates polymers useful in the subject methods and compositions comprises a string of identical subunits, i.e., includes a series of identical subunits according to Formula II:

Formula II wherein, as valence and stability permit,

X represents O or S, preferably O, $R_1$ represents a substituent on the ring to which it is attached, such as H, lower alkyl, hydroxyl, amino, thiol, alkoxy, alkylamino, alkylthio, carbonyl, nitro, cyano, halogen, acyloxy, or acylamino, preferably H;

R represents H or substituted or unsubstituted lower alkyl, lower alkenyl, lower alkynyl, aralkyl, or heteroaralkyl, preferably H or lower alkyl;

m represents an integer from 0 to 10, preferably from 1 to 6; and n represents an integer greater than 5, preferably from 20 to 10,000.

In certain embodiments, a subject polymer may consist essentially of such subunits, or may include, separately or interspersed with subunits as described above, up to 10%, up to 20%, up to 30%, or even up to 50% of other subunits, such as pyrrolyl subunits substituted with moieties other than those described above.

In certain embodiments, a subject polymer comprises a series of subunits having a structure of Formula II, wherein, as valence and stability permit, X represents O, $R_1$ represents H, lower alkyl, hydroxyl, amino, thiol, alkoxy, alkylamino, alkylthio, carbonyl, nitro, cyano, halogen, acyloxy, or acylamino, preferably H;

R represents H or lower alkyl;

m represents an integer from 1 to 6; and n represents an integer from 20 to 10,000.

In certain embodiments, a subject polymer may consist essentially of such subunits, or may include, separately or interspersed with subunits as described above, up to 10%, up to 20%, up to 30%, or even up to 50% of other subunits, such as pyrrolyl subunits substituted with moieties other than those described above.

In still other embodiments, the subject polymer comprises a plurality of subunits having a structure of Formula III:

Formula III wherein, as valence and stability permit, and independently for each subunit, X represents O or S, preferably O;

Z represents a substituent that is charged under physiological conditions or is hydrolyzable to such a substituent under physiological conditions, such as $C(=O)XR$, $P(=O)(OR)_2$, $SO_3R$, $^+NR_3$, $NR_2$, or a guanidine or guanidinium substituent;

L represents a substituted or unsubstituted alkyl moiety, preferably a lower alkyl moiety (branched or unbranched);

$R_1$ represents a substituent on the ring to which it is attached, such as H, lower alkyl, hydroxyl, amino, thiol, alkoxy, alkylamino, alkylthio, carbonyl, nitro, cyano, halogen, acyloxy, or acylamino, preferably H;

R represents H or substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl, preferably H or lower alkyl; and m represents an integer from 0 to 10, preferably from 1 to 6.

In certain embodiments, a subject polymer may consist essentially of such subunits, or may include, separately or interspersed with subunits as described above, up to 10%, up to 20%, up to 30%, or even up to 50% of other subunits, such as pyrrolyl subunits substituted with moieties other than those described above.

In certain embodiments, the subunits have a structure of Formula III wherein, as valence and stability permit, and independently for each subunit, X represents O, Z represents $C(=O)XR$, $P(=O)(OR)_2$, $SO_3R$, $^+NR_3$, $NR_2$, or a guanidine or guanidinium substituent;

L represents a lower alkyl moiety (branched or unbranched);

R₁ represents H, lower alkyl, hydroxyl, amino, thiol, alkoxy, alkylamino, alkylthio, carbonyl, nitro, cyano, halogen, acyloxy, or acylamino, preferably H;

R represents H or lower alkyl; and m represents an integer from 1 to 6.

In certain embodiments, a subject polymer may consist essentially of such subunits, or may include, separately or interspersed with subunits as described above, up to 10%, up to 20%, up to 30%, or even up to 50% of other subunits, such as pyrrolyl subunits substituted with moieties other than those described above.

In certain embodiments, a polymer useful in the subject methods and compositions comprises a string of identical subunits, i.e., includes a series of identical subunits according to Formula IV:

Formula IV wherein, as valence and stability permit,

X represents O or S, preferably O,

Z represents a substituent that is charged under physiological conditions or is hydrolyzable to such a substituent under physiological conditions, such as C(=O)XR, P(=O)(OR)₂, SO₃R, ⁺NR₃, NR₂, or a guanidine or guanidinium substituent;

L represents a substituted or unsubstituted alkyl moiety, preferably a lower alkyl moiety (branched or unbranched);

R₁ represents a substituent on the ring to which it is attached, such as H, lower alkyl, hydroxyl, amino, thiol, alkoxy, alkylamino, alkylthio, carbonyl, nitro, cyano, halogen, acyloxy, or acylamino, preferably H;

R represents H or substituted or unsubstituted lower alkyl, lower alkenyl, lower alkynyl, aralkyl, or heteroaralkyl, preferably H or lower alkyl;

m represents an integer from 0 to 10, preferably from 1 to 6; and n represents an integer greater than 5, preferably from 20 to 10,000.

In certain embodiments, a subject polymer comprises a series of subunits having a structure of Formula IV, wherein, as valence and stability permit, X represents O, Z represents C(=O)XR, P(=O)(OR)₂, SO₃R, ⁺NR₃, NR₂, or a guanidine or guanidinium substituent;

L represents a lower alkyl moiety (branched or unbranched);

R₁ represents H, lower alkyl, hydroxyl, amino, thiol, alkoxy, alkylamino, alkylthio, carbonyl, nitro, cyano, halogen, acyloxy, or acylamino, preferably H;

R represents H or lower alkyl;

m represents an integer from 1 to 6; and n represents an integer from 20 to 10,000.

In certain embodiments, a subject polymer comprises a region having a structure of the formula:

wherein, as valence and stability permit,

R represents H or substituted or unsubstituted lower alkyl, lower alkenyl, lower alkynyl, aralkyl, or heteroaralkyl, preferably H or lower alkyl;

m represents an integer from 0 to 10, preferably from 1 to 6; and n represents an integer greater than 5, preferably from 20 to 10,000.

In yet another embodiment, the present invention provides a method for preparing a polymer according to one of the above formulae. Thus, in one embodiment, a subject polymer may be prepared by polymerizing one or more monomers having a structure of Formula V:

Formula V wherein, as valence and stability permit,

X represents O or S, preferably O,

X₁ and X₂ independently represent H, halogen, trialkylstannyl, or a boronic acid or boronic ester moiety;

Z represents a substituent that is charged under physiological conditions or is hydrolyzable to such a substituent under physiological conditions, such as C(=O)XR, P(=O)(OR)₂, SO₃R, ⁺NR₃, NR₂, or a guanidine or guanidinium substituent;

L represents a substituted or unsubstituted alkyl moiety, preferably a lower alkyl moiety (branched or unbranched);

R₁ represents a substituent on the ring to which it is attached, such as H, lower alkyl, hydroxyl, amino, thiol, alkoxy, alkylamino, alkylthio, carbonyl, nitro, cyano, halogen, acyloxy, or acylamino, preferably H;

R represents H or substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl, preferably H or lower alkyl; and m represents an integer from 0 to 10, preferably from 1 to 6.

Other combinations of X, Z, L, R₁, R, and m may be employed, such as those described above.

In yet another embodiment, the present invention provides a method for preparing a polymer according to one of the above formulae. Thus, in one embodiment, a subject polymer may be prepared by polymerizing one or more monomers having a structure of Formula VI:

Formula VI wherein, as valence and stability permit,

X represents O or S, preferably O, $X_1$ and $X_2$ independently represent H, halogen, trialkylstannyl, or a boronic acid or boronic ester moiety;

$R_1$ represents a substituent on the ring to which it is attached, such as H, lower alkyl, hydroxyl, amino, thiol, alkoxy, alkylamino, alkylthio, carbonyl, nitro, cyano, halogen, acyloxy, or acylamino, preferably H;

R represents H or substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl, preferably H or lower alkyl; and m represents an integer from 0 to 10, preferably from 1 to 6.

Other combinations of X, $R_1$, R, and m may be employed, such as those described above.

In certain embodiments, the polymerization is performed electrochemically, e.g., by applying a voltage to a solution comprising monomers of Formula V or VI. In such embodiments, preferred substituents for $X_1$ and $X_2$ include H and halogen (such as Cl, Br, and I), preferably H. Techniques for generating polypyrrole polymers from pyrrole monomers by electrochemical reactions are well known in the art and are described, for example, in U.S. patent application Ser. Nos. 6,206,937, 6,214,260, 5,948,232, 5,384,215, and references cited therein. In certain embodiments, a polymer coating can be applied directly to a conductive surface by employing the surface as one of the electrodes in the solution. In other embodiments, the polymer may be prepared first, and then applied to a surface or molded into an article by any suitable technique, as is well known in the art In certain embodiments, the polymerization is performed catalytically, e.g., through a Stille or Suzuki cross-coupling reaction. In such embodiments, a homopolymer can be prepared from a monomer wherein $X_1$ represents a halogen (preferably Br or I) and $X_2$ represents a boronic acid, boronate ester, or trialkylstannyl moiety, an alternating copolymer can be prepared from two monomers wherein $X_1$ and $X_2$ of one monomer are halogen and $X_1$ and $X_2$ of the other monomer are boronic acid, boronate ester, or trialkylstannyl moieties, and more complex copolymers can be prepared using two or more moieties having different combinations of $X_1$ and $X_2$.

We have described a simple yet efficient approach toward the synthesis of bioerodible Ppy-like polymers. The subject approach has two distinct advantages over those described in the art. Firstly, the erosion rate of the film can be altered by either changing the ratio of the R-protected pyrrole to the pyrrole moiety containing ionizable group in the polymer backbone or by changing the hydrophobicity of the R group or by changing the lability of the hydrolyzable linkage. Secondly, biological relevant molecules can be presented or released at the film surface by linking it to the hydrolyzable group in the pyrrole molecule. We have also demonstrated that these Ppy surfaces are capable of supporting attachment, proliferation and differentiation of primary human pluripotent cells such as bone marrow-derived mesenchymal progenitor cells. These novel bioerodible Ppy may find uses in leading edge technologies such as "pharmacy on a chip", coatings for implantable medical devices, matrices for drug delivery and substrates for the manipulation of cellular functions.

A novel approach for the creation of bioerodible conductive materials based on the synthesis of polypyrrole (Ppy) with hydrolyzable/ionizable side groups will be introduced. The erosion of the pellets and films formed from acid functionalized Ppy (Ppy-acid) was investigated as a function of pH. The rate of erosion accelerated with the increase of pH of the media. The erosion of the pellets formed from an analogous ester derivatized Ppy at physiological conditions as monitored by UV-visible spectroscopy and mass loss measurements was significantly slower than that of the Ppy-acid pellets. After 60 days of incubation the mass loss of Ppy-acid pellets was 25%, whereas for ester derivative 5%, suggesting a means for controlling and tailoring erosion rates. Ppy-acid surfaces are capable of supporting the attachment, proliferation, and differentiation of primary human pluripotent cells. The growth and differentiation of human bone marrow stroma-derived mesenchymal progenitor cells will be discussed.

In certain embodiments, the subject polymers can be used to as part of a method for controlling cell function, proliferation, and differentiation by culturing cells on electrically conducting polymeric surfaces. Substrates are prepared which are formed of or coated with an electrically conducting biocompatible polymer of the present invention, e.g., which are used in vitro for cell culture, or in vivo to aid in healing, prevent surgical adhesions, repair bone or tissue defects, or replace missing or insufficient cellular function. Adhesion of the cells can be enhanced, and the effect on function, differentiation and proliferation modified, through binding of attachment molecules of defined types and in specific densities, to the conducting polymers. The cells are seeded onto, or the device implanted adjacent to, cells which are to be affected. Voltage is applied to the polymer in a range which induces the desired effect on the cells while not damaging the cells.

To illustrate, the subject polymers can be used in a method for altering the differentiation of anchorage dependent cells, which includes the steps of:

binding cell surface receptor-specific attachment molecules of defined types and in a defined density to a surface consisting of an electrically conducting polymer, attaching anchorage-dependent cells to the cell surface receptor-specific attachment molecules on the electrically conducting polymer surface, and applying a voltage in an effective amount to change the oxidation state of the electrically conducting polymer thereby to alter the differentiation as a function of the type and density of the attachment molecules and applied voltage.

For example, this method can be used for such devices and structures as sutures, bone screws, nails, plates, tubes, sheets, films, stents, and scaffolds for tissue engineering. Examples of attachment molecules include gelatin, albumin, fibronectin, laminin, carbohydrates, asialoglycoproteins, lectins, growth factors, low density lipoproteins, heparin, poly-lysine, thrombin, vitronectin, fibrinogen, peptides, and mixtures thereof.

Yet another aspect of the present invention relates to methods and support systems for modifying the regeneration, differentiation, or function of neuronal cells both in vivo and in vitro. In one embodiment, the subject electrically conducting polymers, alone or in combination with other polymeric supports, are used in vitro for nerve cell growth, or in vivo to aid in healing nervous tissue defects. The conducting polymers may be implanted adjacent to or seeded with cells which are to be affected. Voltage or current may be applied to the polymer in a range which induces the desired effect on the cells while not damaging the cells. In a preferred embodiment, the conducting polymers include polypyrroles which are easy to prepare and permit focused neuronal stimulation The present invention also contemplates the use of the subject polymers as part of compositions, methods and systems for the stimulation of biological activities within bone marrow stromal cells where it may be advantageous to apply electromagnetic stimulation to an electroactive material. In general such a method involves attaching or associating the desired bone marrow stromal cells to or with a surface comprising an electroactive material of the present invention, and applying electromagnetic radiation directly to the desired area. In preferred embodiments, the stimulation of biological activities within bone marrow stromal cells results from inducing one or more activities including, but not limited to, gene expression, cell growth, cell differentiation, signal transduction, membrane permeability, cell division and cell signalling. In particularly preferred embodiments, the present invention stimulates bone cell regeneration. In exemplary embodiments, the subject electroactive materials are provided as two-dimensional substrates such as thin films having at least one surface of an electroactive material, or in alternative embodiments, the as three-dimensional substrates comprising a matrix having at least one surface of an electroactive material.

Still another aspect of the present invention utilizes the subject polymers as part of a fabrication method for microchips that control both the rate and time of release of multiple chemical substances and allow for the release of a wide variety of molecules in either a continuous or pulsatile manner. Microchips are miniaturized devices constructed using methods commonly applied to the manufacture of integrated circuits, methods such as ultraviolet (UV) photolithography, reactive ion etching, and electron beam evaporation. The microchips provide control over the rate the molecules are released as well as the time at which release begins. The time of release can be controlled passively or actively.

In preferred embodiments, a material that is impermeable to the drugs or other molecules to be delivered and the surrounding fluids is used as the substrate. Reservoirs are etched into the substrate using either chemical (wet) etching or plasma (dry) etching techniques well known in the field of microfabrication. Hundreds to thousands of reservoirs can be fabricated on a single microchip using these techniques. A release system, which includes the molecules to be delivered, is inserted into the reservoirs by injection, inkjet printing, spin coating methods, or other means. The device design makes it possible to fill the reservoirs with a release system in solid, liquid, or gel form. Exemplary release systems include polymers and polymeric matrices, non-polymeric matrices, and other excipients or diluents. The rate of release of the molecules is a function of the composition and structure of the release system. The reservoirs can contain multiple drugs or other molecules in variable dosages. Each of the reservoirs of a single microchip can contain different molecules and/or different amounts and concentrations, which can be released independently. The filled reservoirs are capped with the subject electrically conductive material, e.g., to enable active timed release. To illustrate, the reservoir caps consist of a thin film of the subject conductive material that is deposited over the reservoir, patterned to a desired geometry, and serves as an anode. Cathodes are also fabricated on the device with their size and placement dependent on the device's application and method of electric potential control. When an electric potential is applied between an anode and cathode, the conductive material of the anode above the reservoir oxidizes to form soluble compounds that dissolve into solution, exposing the release system containing the molecules to be delivered to the surrounding fluids. Alternatively, the application of an electric potential can be used to create changes in local pH near the anode reservoir cap. This would allow the reservoir cap to dissolve and expose the release system to the surrounding fluids. Release from such as active device can be controlled by a preprogrammed microprocessor, remote control, or by biosensors.

Polypyrrole, unlike external electrodes, can be noninvasively stimulated using an external electromagnetic field. Finally, unlike piezoelectric materials that require small mechanical deformations for the generation of electrical charges, current passing through polypyrrole can be controlled externally to optimize or adjust stimulation conditions.

A polymer or glass fiber coated with PPy or other conducting polymer in a selected region may be used as a biocompatible electrochemical sensor that may be inserted or implanted into a cell or other small area.

What is claimed is:

1. A method for controlling cell function, proliferation, or differentiation, comprising contacting cells with bioerodible polymer composition comprising a plurality of subunits having a structure of Formula I:

Formula I wherein, as valence and stability permit, and independently for each subunit, X is selected from O and S;

$R_1$ is selected from H, lower alkyl, hydroxyl, amino, thiol, alkoxy, alkylamino, alkylthio, carbonyl, nitro, cyano, halogen, acyloxy, and acylamino;

R is selected from H and substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl; and m represents an integer from 0 to 10.

2. The method of claim 1, wherein: X is O; R is selected from H and lower alkyl; and m is an integer from 1 to 6.

3. A method for controlling cell function, proliferation, or differentiation, comprising contacting cells with a bioerodible polymer comprising a polymer represented by Formula II:

Formula II wherein, as valence and stability permit, and independently for each subunit, X is selected from O and S;

R$_1$ is selected from H, lower alkyl, hydroxyl, amino, thiol, alkoxy, alkylamino, alkylthio, carbonyl, nitro, cyano, halogen, acyloxy, and acylamino;

R is selected from H and substituted or unsubstituted lower alkyl, lower alkenyl, lower alkynyl, aralkyl, or heteroaralkyl;

m represents an integer from 0 to 10; and n represents an integer greater than 5.

4. The method of claim 3, wherein n is an integer from 20 to 10,000.

5. The method of claim 4, wherein: X is O; and R is selected from H and lower alkyl; m is an integer from 1 to 6.

6. A method for controlling cell function, proliferation, or differentiation, comprising contacting cells with a bioerodible polymer comprising a plurality of subunits having a structure of Formula III:

Formula III wherein, as valence and stability permit, and independently for each subunit, X is selected from O and S;

Z is a substituent that is charged under physiological conditions or is hydrolyzable to such a substituent under physiological conditions;

L is a substituted or unsubstituted alkyl moiety;

R$_1$ is selected from H, lower alkyl, hydroxyl, amino, thiol, alkoxy, alkylamino, alkylthio, carbonyl, nitro, cyano, halogen, acyloxy, and acylamino;

R is selected from H and substituted or unsubstituted lower alkyl, lower alkenyl, lower alkynyl, cycloalkyl, cycloalkylalkyl, heterocyclyl, heterocyclylalkyl, heteroaryl, aralkyl, or heteroaralkyl; and m is an integer from 0 to 10.

7. The method of claim 6, wherein: X represents O; Z represents C(=O)XR, P(=O)(OR)$_2$, SO$_3$R, $^+$NR$_3$, NR$_2$, or a guanidine or guanidinium substituent; L is a branched or unbranched lower alkyl moiety; R is selected from H and lower alkyl; and m represents an integer from 1 to 6.

8. A method for controlling cell function, proliferation, or differentiation, comprising contacting cells with bioerodible polymer comprising a region having a structure of the formula:

wherein, as valence and stability permit, and independently for each subunit,

R is selected from H and substituted or unsubstituted lower alkyl, lower alkenyl, lower alkynyl, aralkyl, or heteroaralkyl;

m is an integer from 0 to 10; and n is an integer greater than 5.

9. The method of any one of claims 1, 3, 6 or 8, wherein the polymer supports the attachment and proliferation of cells.

10. The method of any one of claims 1, 3, 6 or 8, wherein the polymer is electrically conductive.

11. The method of claim 1, wherein the polymer has a ratio of the R-protected pyrrole to pyrrole moieties containing ionizable groups so as to have a predetermined bioerosion rate.

12. The method of claim 1, wherein the polymer includes, separately or interspersed with subunits, up to 50% of other heterologous subunits.

13. A method of any one of claims 1, 3, 6, or 8, wherein the polymer or polymer composition is a film.

14. An implantable medical device method of any one of claims 1, 3, 6, or 8, wherein the polymer or polymer composition is a pellet.

15. A method of any one of claims 1, 3, 6, or 8. wherein the cells are cultured on an implantable medical device or structure having a coating comprising the bioerodible polymer.

16. A method of claim 9, further comprising at least one attachment molecule.

* * * * *

UNITED STATES PATENT AND TRADEMARK OFFICE
CERTIFICATE OF CORRECTION

PATENT NO. : 7,291,693 B2
APPLICATION NO. : 10/180000
DATED : November 6, 2007
INVENTOR(S) : Shastri et al.

It is certified that error appears in the above-identified patent and that said Letters Patent is hereby corrected as shown below:

In Claim 1, column 12, line 43, please replace "with bioerodible" with --with a bioerodile--;

In Claim 1, column 12, line 50, please replace "  " with --  --;

In claim 14, column 14, line 50, please replace "An implantable medical device" with --A--.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,291,693 B2  
APPLICATION NO. : 10/180000  
DATED : November 6, 2007  
INVENTOR(S) : Venkatram Prasad Shastri It is certified that error appears in the above-identified patent and that said Letters Patent is hereby corrected as shown below:

After the paragraph starting with "This application claims the benefit...", column 1, lines 6-9, please add the following paragraph:

--This invention was made with government support under Grant No. U54 HD029125 awarded by the National Institutes of Health. The government has certain rights in this invention.--

Signed and Sealed this
Sixteenth Day of October, 2012

David J. Kappos
*Director of the United States Patent and Trademark Office*